Figure 1:
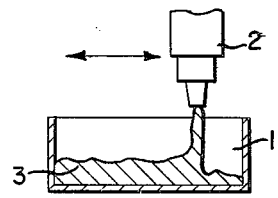

Oct. 31, 1961     R. E. KNOX     3,006,033

PROCESS FOR PREPARING A MOLDED CELLULAR ARTICLE

Filed July 27, 1959

*INVENTOR*
ROGER E. KNOX

BY *Robert C. Kline*

*ATTORNEY*

3,006,033
PROCESS FOR PREPARING A MOLDED CELLULAR ARTICLE

Roger E. Knox, Brandywine Hundred, Del., assignor to E. I. du Pont de Nemours and Company, Wilmington, Del., a corporation of Delaware
Filed July 27, 1959, Ser. No. 829,502
5 Claims. (Cl. 18—48)

This invention relates to a process for preparing polyurethane foams and more particularly to an improved process for molding resilient polyurethane foams to meet precise dimensional tolerances.

Resilient polyurethane foams are finding an ever-increasing market in the furniture and automotive trade. They display higher load-bearing capacity, better abrasion resistance, and less flammability than conventional latex rubber foam. It has been difficult, however, to fabricate many types of molded polyurethane articles having thin sections with a high surface-to-volume ratio, particularly automobile topper pads. Localized foam collapse often occurs during expansion of foamable compositions confined by the conventional molds. It is possible by precise loading and distribution of a fast-reacting fluid, foamable composition to mold acceptable cellular polyurethane articles. However, the care needed is incompatible with large-scale industrial production.

In preparing a specific cellular article, a piece of slab foam can be trimmed to the desired shape. However, such a process is not satisfactory. The scrap loss is uneconomical, the contouring of subtle shapes is difficult and inconvenient to reproduce, and the products obtained do not have the needed quality which has been termed by the trade as "show room feel."

Recently it was found that polyurethane foam collapse during molding could be avoided by a process wherein an expanding foam and subjected to a specified compressive pressure which was relieved as soon as the maximum foam volume had been attained. More particularly, this development concerned a process for the preparation of a resilient polyurethane foam which comprised introducing a fluid, foamable polyurethane composition into a mold, positioning the mold cover-plate, allowing the foamable composition to expand at atmospheric pressure to fill the space defined by the mold and cover-plate, allowing the resulting foam to become tack free, removing the cover-plate and stripping the foam from the mold; with the provision that: (1) the cover-plate employed uniformly rise in a substantially vertical direction when contacted by the expanding foamable composition and exert a compressive pressure over substantially the entire surface of the expanding composition, the compressive pressure having a value less than that of the maximum pressure exerted by the expanding composition after it has contacted the cover-plate; and (2) the cover-plate be immobilized when the foamable composition has fully expanded.

Although excellent molded polyurethane cellular articles have been made by the foregoing process, it has left something to be desired. The dimensions of many commercial articles are specified to very close tolerances. They could not be conveniently met by the foregoing process because the foam, prior to immobilization of the lid, had to expand (often as much as 5%) beyond the original dimensions of the mold. The excess foam then had to be trimmed off to meet specifications.

It is an object of the present invention to provide an improved process for molding polyurethane foams. A further object is to provide an improved process for molding low density, resilient polyurethane foams having a high surface-to-volume ratio. A still further object is to provide a process for molding polyurethane foams within precise dimensional tolerances. Another object is to provide an improved process for molding cellular polyurethane topper pads.

These and other objects of this invention are accomplished by a process for preparing a molded cellular polyurethane article which comprises introducing into the cavity of a rigid mold a foamable polyurethane composition which is permitted to expand upward therein, employing a cover-plate for said mold which cover-plate uniformly rises in a substantially vertical direction when contacted by said expanding foamable composition, said cover-plate exerting a compressive pressure over substantially the entire surface of said expanding foamable composition, said compressive pressure being from about 10 to 90 percent of the maximum upward pressure exerted by said expanding foamable composition, immobilizing said cover-plate after said foamable composition has fully expanded and occupies from about 1.005 to 1.5 times the volume of the mold, applying sufficient pressure on said foam with the cover-plate when the foam has become tack-free to cause the foam, while still plastic, to conform to the dimensions defined by the cavity of said mold and the underside of said cover-plate, allowing said compressed foam to become non-plastic, removing said cover-plate and stripping said foam from the mold.

Figure 2:
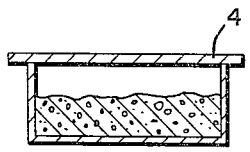
Figure 3:
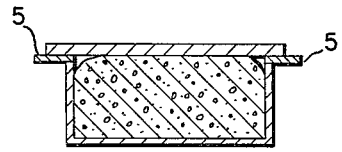
Figure 4:
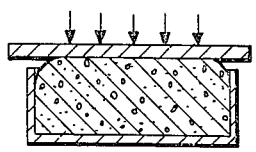
Figure 5:
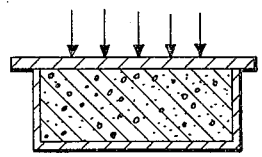
Figure 6:
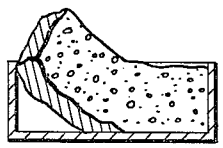

This invention is more particularly illustrated in the accompanying drawing. FIGURE 1 is a cross section of a mold cavity 1 as it is being filled by means of a mixing head 2 with a foamable polyurethane composition 3. FIGURE 2 shows the same mold cavity with a cover plate 4 in place as the foamable polyurethane composition is expanding. In FIGURE 3 the polyurethane composition has expanded to a sufficient extent so as to raise the cover plate above the top of the mold. The compressive pressure exerted by the cover plate is less than the pressure exerted by the expanding polyurethane composition. After the composition has fully expanded, wedges 5 are inserted between the underside of the cover plate and the top of the mold cavity so as to relieve the compressive pressure exerted by the cover plate. After the expanded polyurethane composition has become a tack-free plastic, the wedges are removed and FIGURES 4 and 5 show the application of a sufficient amount of pressure on the composition to cause it to conform to the dimensions defined by the cavity of the mold and the underside of the cover plate. FIGURE 6 shows the foam as it is being stripped from the mold.

By following the process of the present invention, it is no longer necessary to use precise loading techniques in order to make a molded cellular article which will meet close dimensional tolerances. In accordance with the subject process, about 0.5 to 50 percent excess foamable polyurethane composition is added to a mold, a cover-plate is positioned on said mold, the foamable mass raises the cover-plate and expands beyond the dimensions of the mold, the compressive pressure exerted by the cover-plate is relieved, the porous mass is allowed to set to a plastic, moldable tack-free state, and then pressure is applied with the cover-plate to force the excess foam back into the mold while the foam is still plastic. The foam is maintained in this condition until it achieves a non-plastic state and is then removed from the mold. Contrary to expectation, this final compression does not adversely affect the homogeneity of the cellular article. No abnormal increase in density occurs in the region adjacent to the area where the compressive force is applied.

In general, these polyurethane cellular materials are prepared by the reaction of a relatively high molecular weight polyhydroxy compound with a molar excess of a polyisocyanate followed by reaction with water or another polyhydroxy compound in the presence of a gaseous expanding agent. The selection of the polyhydroxy compound and/or the polyisocyanate will determine the type of polyurethane obtained. The reaction of the polyhydroxy compound with the polyisocyanate produces the foamable polyurethane and the cellular material is obtained from this polyurethane by generating a gaseous expanding agent therein. This gaseous expanding agent may be carbon dioxide, which would be obtained by the addition of water, which would react with the polyisocyanate compound to form carbon dioxide simultaneously with the formation of urea cross-links. Another method available for forming a gaseous expanding agent is to use a liquid which is inert to isocyanates and which will vaporize at the temperature of the foaming reaction and thus cause expansion to the cellular material. Representative liquids which may be used include pentane, and similar hydrocarbons, trichlorofluoromethane (B.P. 23.8° C.) and other polyhalogenated hydrocarbon compounds such as trichlorotrifluoroethane (B.P. 47° C.), dichlorohexafluoropropane (B.P. 33–35.8° C.), monochloroheptafluorocyclobutane (B.P. 25° C.), dichlorodifluoroethylene (B.P. 20° C.), and 2,3-dichloro-1,1,3,3-tetrafluoropropene-1 (B.P. 47° C.). Trichloromonofluoromethane is preferred.

Any of a wide variety of polyhydroxy compounds may be employed for the preparation of the polyurethane cellular material. These polyhydroxy compounds should have molecular weights of from about 750 to about 8,000 with a molecular weight of from about 1,000 to 4,000 being preferred. The higher molecular weight polyhydroxy compounds yield the more resilient type of cellular materials. Representative polyhydroxy compounds include polyalkyleneether glycols, polyalkyleneether-thioether glycols, polyalkylenearyleneether glycols, polyaliphatic hydrocarbon diols, polyester polyols, polyethers derived from oxyalkylation of glycerine, and fatty acid triglycerides having a hydroxyl number of at least about 49. These triglycerides may be either a naturally occurring oil, such as castor oil, or may be a blown drying oil of the type known in the trade as "heavy bodied" oils, such as blown linseed, tung, poppyseed, hempseed, soya oils and the like. In addition, compounds such as tetrols which are obtained by reacting ethylenediamine with ethylene and/or propylene oxide may be used. It is to be understood that two or more different polyols may be used to react with the organic polyisocyanate.

The useful polyalkyleneether glycols may be represented by the formula $HO(RO)_nH$ where R is an alkylene radical containing up to 10 carbon atoms and $n$ is an integer sufficiently large that the molecular weight of the polyalkyleneether glycol is about 750 to 8,000. Not all of the alkylene radicals need be the same. Representative examples of these glycols are poly-1,2-propyleneether glycol, 1,2 - polydimethylethyleneether glycol, ethylene oxide-modified poly-1,2-propyleneether glycol, polytetramethyleneether glycol, polypentamethyleneether glycol, and polytetramethyleneformal glycol. These polyalkyleneether glycols are made by the polymerization of cyclic ethers such as alkylene oxides or dioxolane or by condensation of glycols.

The polyalkyleneether-thioether glycols may be represented by the formula $HO(GY)_nH$, wherein G represents hydrocarbon radicals at least some of which are alkylene, Y represents chalcogen atoms some of which are sulfur and the rest oxygen, and $n$ is an integer sufficiently large so that the glycol has a molecular weight of about 750 to 8,000. Procedures for their preparation are given in French Patent 1,128,561.

The polyalkylene-aryleneether glycols are similar to the polyalkyleneether glycols except that some arylene radicals are present. The phenylene, naphthalene and anthracene radicals may be used with or without substituents such as alkyl or alkylene groups. When part of the ether oxygens are replaced with sulfur, a polyalkylene-aryleneether-thioether glycol results, which also may be used in the present invention.

Polyalkyleneethers having three or more hydroxyl groups may also be used. These compounds may be obtained by condensing ethylene or propylene oxide, or mixtures thereof, with an aliphatic polyol such as trimethylolpropane, glycerol, pentaerythritol, etc.

Still another useful class of compounds are the polyaliphatic hydrocarbon diols. The aliphatic portion of these polymers may be saturated or there may be chain and side-chain ethylenic unsaturation present. Procedures for their preparation are given in U.S. 2,877,212.

The polyesters containing a plurality of hydroxyl groups which are useful have a molecular weight between about 750 and 8,000; they are made by the polymerization of cyclic lactones such as ε-caprolactone or by the condensation polymerization from a dicarboxylic acid and a molar excess of an organic diol (optionally, a small amount of an organic triol such as trimethylolpropane may be included to provide cross-linking). Representative diols are ethylene glycol, 1,4-butane diol, diethylene glycol, and thiodiglycol. Representative acids are adipic acid, azelaic acid, maleic acid and phthalic anhydride.

Any of a wide variety of polyisocyanate compounds may be used for the preparation of the polyurethane cellular materials. Representative polyisocyanate compounds include toluene-2,4-diisocyanate, 1,5-naphthalenediisocyanate, cumene-2,4-diisocyanate, 4-methoxy-1,3-phenylenediisocyanate, 4-chloro-1,3-phenylenediisocyanate, 4-bromo-1,3 - phenylenediisocyanate, 4-ethoxy-1,3-phenylenediisocyanate, 2,4'-diisocyanatodiphenylether, 5,6-dimethyl-1,3-phenylenediisocyanate, 2,4 - dimethyl-1,3-phenylenediisocyanate, 4,4'-diisocyanatodiphenylether, benzidinediisocyanate, 4,6-dimethyl-1,3-phenylenediisocyanate, 9,10-anthracenediisocyanate, 4,4'-diisocyanatodibenzyl, 3,3-dimethyl-4,4'-diisocyanatodiphenylmethane, 2,6-dimethyl-4,4'-diisocyanatodiphenyl, 2,4-diisocyanatostilbene, 3,3'-dimethyl-4,4' - diisocyanatodiphenyl, 3,3'-dimethoxy-4,4'-diisocyanatodiphenyl, 1,4-anthracenediisocyanate, 2,5-fluorenediisocyanate, 1,8-naphthalenediisocyanate, 2,6-diisocyanatobenzfuran, and 2,4,6-toluenetriisocyanate. It is to be understood that mixtures of two or more of these polyisocyanates may be employed. Aromatic isocyanates are preferred, particularly toluene diisocyanate.

In preparing the polyurethane cellular material from the polyhydroxy compound and the polyisocyanate, it is necessary that a gaseous expanding agent be present. This agent may be a liquid which can be dispersed or preferably dissolved in the reactants and which will vaporize at the temperature of the reaction and thus cause expansion. Typical of such liquids are the halogenated hydrocarbons such as trichlorofluoromethane. If desired, such mixtures can be prepared at low temperatures. On the other hand, the expanding agent may be carbon dioxide generated by the action of excess isocyanate with water, or any free carboxyl groups which may be present in the composition. When water is used, about 0.5 to 1.5 moles (0.6 to 1.0 mole being preferred), is supplied for each mole of available isocyanate groups.

The procedure for making the polyurethane cellular material may be carried out in any one of several well-recognized ways. In the first instance, a prepolymer may be formed by reacting the polyhydroxy compound with a molar excess of an organic polyisocyanate and then mixing this prepolymer with water and catalyst and pouring the foamable mass into the mold. British Patent 797,965 discloses a number of procedures for making resilient cellular bodies from a polytetramethyleneether glycol. In another procedure, a part of the polyhydroxy compound may be reacted with a molar excess of the polyisocyanate while another portion of the polyhydroxy compound may be reacted with a molar deficiency of the polyisocyanate. Into the latter may be mixed a catalyst and a vaporizable liquid such as trichlorofluoromethane and then the two prepolymer masses may be mixed and poured into the mold. In this case the heat of reaction of the isocyanate and polyhydroxy compounds is sufficient to vaporize the volatile liquid. In a third method the high molecular weight polyhydroxy compound may be reacted with a molar excess of polyisocyanate and then, for the foaming, may be reacted with a mixture of a volatile liquid and a low molecular weight polyhydroxy compound which is present in an amount to react with the remaining free isocyanate groups. A fourth procedure involves the simultaneous introduction of the polyhydroxy compound, the polyisocyanate, and a mixture containing water, a catalyst and a surfactant into a mixer from which the foamable mass is discharged directly into the mold.

When preparing the cellular materials using water to generate carbon dioxide as the foaming agent, it is generally desirable to employ a catalyst. These catalysts may be selected from a wide variety of tertiary amines, such as N-methyl morpholine, triethylamine, diethylethanol amine, and diethanolamine. It is to be understood that mixtures of two or more different catalysts may be used and that in some instances, it may be desirable to use a buffered catalyst. The catalyst may be buffered by partially neutralizing it with a strong mineral acid, such as hydrochloric acid. For purposes of the present invention, the use of N-methyl morpholine, alone or in combination with triethylamine, is preferred for the formation of resilient foams (except as noted below); and the buffered catalyst system which is preferred is a 50 percent aqueous solution of a 2:1 molar ratio of diethylethanolamine hydrochloride and diethylethanolamine. When the resilient polyurethane is prepared in situ during the foaming operation, that is, when a one-shot system is employed, it is desirable to use such especially active catalysts as triethylenediamine or dibutyltin dilaurate; about 0.2 to 0.7 part of such a catalyst is introduced for each 100 parts by weight of the foamable mixture.

In preparing these cellular materials it is frequently desirable to incorporate a surfactant to help control the pore size and uniformity. Amongst the more suitable surfactants are organo silicone polymers such as polydimethylsilanes and block polymers obtained by condensing a polyalkoxy polysilane with the monoether of a polyalkyleneether glycol. These organo silicone polymers should have a molecular weight of about 2500–6000. Other surfactants such as ethylene oxide modified sorbitan mono palmitate or ethylene oxide modified polypropyleneether glycol may be used to obtain better distribution of components.

Any of a wide variety of molds may be employed to carry out the process of this invention. The subject process is of particular value when broad shallow molds (such as topper pad molds) are used having a high surface-to-volume ratio. The mold may be made from any suitable material, such as aluminum, steel, reinforced plastic, or any other material which is dimensionally stable during the operation of the process. It is usually desirable to treat the inner surface of the mold (including the underside of the cover-plate) with a mold release agent, such as a high-melting wax, in order to facilitate removal of the foam. The cover-plate may be made of any material which remains rigid at the processing temperature such as aluminum or plywood. The underside of the cover-plate is preferably flat; however, it may be non-planar.

The amount of foamable polyurethane composition introduced or loaded into the mold may range from about 0.5 to 50.0 percent in excess of that amount which, when fully expanded, will exactly fill the volume as defined by the dimensions of the mold with the cover plate in place. It is generally preferred for economic reasons to limit the value of the excess amount to about 5 percent. It is not convenient to use less than 0.5 percent excess because more precise loading is then required to insure that sufficient material has been added to fill the mold.

After the foamable composition is introduced into the mold, the cover-plate is positioned and the composition expands at atmospheric pressure and contacts the underside of the cover plate prior to attaining maximum volume. When the sides of the mold cavity are not parallel, such as in a topper pad mold, the cover-plate obviously cannot be fully introduced into the mold and accordingly is positioned near or at the top of the mold. The foamable composition may be in contact with the cover-plate at the time expansion starts or in the instance where the cover-plate is positioned at the top of the mold, the foamable composition may have expanded to about 66.6 to 99.5 percent of its maximum volume prior to the time it comes in contact with said plate. In either event, the remaining expansion by the foamable composition lifts the cover-plate which in turn is exerting a compressive pressure on the confined foam.

The rate of the foaming reaction which may include the reaction between the high molecular weight polyhydroxy compound and the polyisocyanate or the isocyanate-terminated prepolymer and the other reactants (water, other polyhydroxy compounds, etc.) may be controlled by several factors, most important of which are the nature of the polyhydroxy compounds, the particular polyisocyanate used, the presence or absence of catalysts and, if present, the particular catalyst, the temperature, and the foaming agent. The effects of these various factors have been described and are recognized by those skilled in the art. For instance, the rate of reaction of a primary hydroxyl group with an isocyanate is different from that of a secondary hydroxyl group. Isocyanate groups attached to aryl radicals are more reactive than those attached to aliphatic radicals. The presence of substituents, such as nitro groups for instance, on the aromatic ring affects the rate of reaction of the isocyanate group. The shielding effect of bulky groups adjacent to the carbon to which the isocyanate group is attached affects its reaction rate. The temperature at which the reaction takes place also affects the rate of the reaction and the reactivity of the isocyanate group. It is known that basic conditions accelerate the reaction of isocyanate groups with hydroxyl groups while acid conditions tend to slow the reaction. Certain basic amines are known to be active catalysts.

The reaction conditions during foaming may thus be so balanced that after the reactants are mixed together, the mass begins to foam within about 30 seconds to 2 minutes, and when poured into the mold and permitted to foam, will reach its maximum height in about 4–6 minutes.

The compressive pressure exerted by the cover-plate should be from about 10 to 90 percent of the maximum pressure exerted by the composition which is expanding in an upward direction. Any of a wide variety of means may be employed to control the compressive pressure. For example, pulleys and counterweights can be attached to the cover-plate to lighten its weight. Alternatively, the edge of the cover-plate can rest on support pins which, in turn, are seated on springs whose tension is regulated by adjustable nuts. The cover-plate, of course, can be constructed to have the proper weight for molding a particular foamable composition.

After the foam has fully expanded, the cover-plate should be immobilized so as to relieve the compressive pressure, and the foam allowed to achieve a plastic, moldable, tack-free state. Numerous means can be used to immobilize the cover-plate after it has been lifted by the expanding confined composition. Wedges may be slipped in place between the underside of the cover-plate and the top edge of the mold. Shims or ratchets are more convenient.

The length of time required to achieve a plastic, moldable, tack-free state will depend on the particular components being employed to form the polyurethane foam. The state of tackiness is well-known in the polymer field. A surface is not tacky when one is able to move his hand or an object freely over the surface when it is stroked. Expressed in another way, a surface is nontacky when, after another surface is placed against it, the two may be separated at the original interface. On the other hand, a tacky surface causes an object to temporarily hesitate or stick at points and the progress, if any is possible, of stroking is not smooth but is in a series of jerks or alternate rapid moves and stops. Joined tacky surfaces do not separate cleanly at the interface.

When the foam has reached a non-tacky stage, but while it is in a moldable plastic state, it is then made to conform to the dimensions as defined by the cavity of the mold and the underside of the cover-plate. This is accomplished by forcing the foam back into the mold by applying compressive pressure on the cover-plate. The time during which this may be done is normally not very long. In polyurethane systems having active catalysts and many cross-links, the time available may be only one or two minutes. With less active catalysts and systems with fewer cross-links, the period will be several times as long. However, the period is of limited duration, and, in general, will seldom exceed 8–10 minutes. Before operating the subject process, it is usually preferred to carry out at least one trial foaming operation away from the mold to determine approximately how much time the fully expanded foam requires to become tack-free and how long it remains plastic enough to be compressed to the desired volume. The amount of pressure employed to compress the foam to the desired volume will be determined by a number of factors including the type of polyurethane foam, the excess of amount of foamable composition employed and the size of the desired molded article. In any event, no more pressure should be used than is required to attain the desired shape and this amount of pressure can be readily determined by one skilled in the art. The application of compressive pressure is more particularly illustrated in the examples.

After the foam has set to a non-plastic state, the compressive pressure is relieved, the cover-plate removed and the foam stripped from the mold. The resulting foam is then ready for final curing. This is accomplish by passing the foam through rollers where it is compressed to rupture the cell walls. This gives the resulting foam a better "feel" and promotes final curing. The final cure is carried out by heating the foam at a temperature of about 120° C. for about 3 hours at 100 percent relative humidity.

The following examples will better illustrate the nature of the present invention; however, the invention is not intended to be limited to these examples. Parts are by weight unless otherwise indicated.

EXAMPLE 1

A. *Preparation of polyurethane polymer A*

10,000 grams of polypropyleneether glycol of number-average molecular weight 2,000 and 40 grams of water are charged into a dry reactor which is continually protected by a nitrogen atmosphere. After the mixture has been stirred for 30 minutes at about 35–40° C., 1,454 grams of a 80:20 mixture of toluene-2,4- and toluene-2,6-diisocyanate is introduced with strong agitation. Heat is evolved and the temperature rises to about 45–55° C. After about 30 minutes the temperature of the mass begins to drop. External heat is then applied raising the temperature to 120° C. in about 40 minutes. After the mass has been agitated at 120° C. for 75 minutes, 2,300 additional grams of the toluene diisocyanate isomer mixture is introduced. The mass is stirred 30 minutes more while being cooled to 40° C. Polyurethane polymer A thus obtained has a free isocyanate content of about 9.5 percent and exhibits a Brookfield viscosity of 11,000 cps. at 30° C.

B. *Preparation of the masterbatch B*

A masterbatch is prepared by mixing 10,000 grams of polyurethane polymer A, 50 grams of polydimethylsiloxane (50 centistokes viscosity) and 1,000 grams of didecyl phthalate at about 40° C.

C. *Preparation of the catalyst solution C*

A catalyst solution is prepared by mixing 1,000 grams of N-methyl morpholine, 300 grams of triethylamine and 2,200 grams of water at room temperature.

D. *The mold*

The aluminum topper pad mold has the following approximate dimensions: 62 inches long on one side, 60¾ inches long on the opposite side, 24¾ inches wide, and 2 inches deep; on both corners of the side 60¾ inches long there is a one-inch indentation extending 2¾ inches along the corresponding short side; at the center of the side 62 inches long there is an indentation 7½ inches long, 1¾ inches wide and 2 inches deep. The flat cover-plate for the mold weighs 24 pounds; its underside has grooves which extend to the edges to allow displaced air to escape.

Prior to use the inside surfaces of the mold are coated with a high melting wax to permit ready removal of the molded articles. The apparatus is then heated to about 49° C. for loading.

E. *Preparation of the cellular article*

Masterbatch B at about 40° C. and catalyst solution C at room temperature are separately pumped at rates of about 3,800 grams per minute and 12 grams per minute, respectively, to an intermittent mixing head of the type described by U.S. 2,868,518 mounted on a reciprocating arm which traverses a 56-inch path at the rate of 100 ft./min. At the mixing head the streams enter separate parts of a rotary valve plug and pass downward into a "basket" mixer where they are intimately dispersed by an agitator revolving 5,800 times a minute; air is also separately introduced into the mixer "basket" at the rate of about 0.25 cu. ft./min. The foamable polyurethane mixture obtained is immediately discharged from the "basket" mixer into the mold. After 32 seconds the loading is finished; about 20 percent excess fluid material has been used. The cover-plate is then positioned. The foamable composition expands to its full volume to fill the mold and lift the cover-plate about a half-inch during the next 90 seconds. The cover-plate is then immobilized for one minute to relieve the compressive pressure. After 4 minutes from time of pour a 500-lb. weight is placed on the cover-plate. The cover-plate is then released and sinks back into place on the mold, thereby compressing the uncured foam to the precise dimensions of the mold cavity. After 15 minutes from time of pour, the weight is removed from the cover-plate. The cover-plate is then removed and the topper pad is stripped from the mold, passed through rollers where it is compressed 90 percent of its height, and finally cured 3 hours at 120° C. and 100 percent relative humidity. The topper pad thereby obtained has a density of about 3 lb./cu. ft. and its shape satisfies dimensional tolerances of about $\frac{1}{16}$ to $\frac{1}{8}$ inch.

EXAMPLE 2

The procedure of Example 1 is repeated except that (1) about 30 percent excess foamable composition is introduced (about 35 seconds' loading time); (2) a 200-lb. weight is substituted for the 500-lb. weight. Essentially the same results are obtained.

EXAMPLE 3

The procedure of Example 2 is repeated except that only about 5 percent excess foamable composition is introduced (28 seconds' loading time). Essentially the same results are obtained.

This application is a continuation-in-part of my copending application Serial No. 789,251, filed January 27, 1959.

As many widely different embodiments of this invention may be made without departing from the spirit and scope thereof, it is to be understood that this invention is not limited to the specific embodiments thereof except as defined in the appended claims.

What is claimed is:

1. A process for preparing a molded cellular polyurethane article which comprises introducing into the cavity of a rigid mold a foamable polyurethane composition which is permitted to expand upward therein, employing a cover-plate for said mold which cover-plate uniformly rises in a substantially vertical direction when contacted by said expanding foamable composition, said cover-plate exerting a compressive pressure over substantially the entire surface of said expanding foamable composition, said compressive pressure being from about 10 to 90 percent of the maximum upward pressure exerted by said expanding foamable composition, immobilizing said cover-plate after said foamable composition has fully expanded and occupies from about 1.005 to 1.5 times the volume of the mold, applying sufficient pressure on said foam with the cover-plate when the foam has become tack-free to cause the foam, while still plastic, to conform to the dimensions defined by the cavity of said mold and the underside of said cover-plate, allowing said compressed foam to become non-plastic, removing said cover-plate and stripping said foam from the mold.

2. A process according to claim 1 wherein the foamable polyurethane composition comprises an isocyanate-terminated polyurethane, a tertiary amine catalyst and water.

3. A process according to claim 2 wherein the isocyanate-terminated polyurethane is prepared by reaction between a molar excess of an organic diisocyanate and a polyalkyleneether glycol having a molecular weight of from about 750 to about 8,000.

4. A process according to claim 3 wherein the polyalkyleneether glycol is a polypropyleneether glycol and the organic diisocyanate is an 80:20 isomer mixture of toluene-2,4- and toluene-2,6-diisocyanate.

5. In the process of preparing a resilient polyurethane foam of low density wherein a fluid foamable polyurethane composition is placed in a mold and permitted to expand in an upward direction, the improvement comprising employing a cover-plate for said mold which uniformly rises in a vertical direction when contacted by said expanding foamable composition, said cover-plate exerting a compressive pressure over substantially the entire surface of said expanding foamable composition, said compressive pressure being from about 10 to 90 percent of the maximum upward pressure exerted by said expanding foamable composition, and immobilizing said cover-plate after said foamable composition has fully expanded.

References Cited in the file of this patent

UNITED STATES PATENTS

| | | |
|---|---|---|
| 2,525,965 | Smith | Oct. 17, 1950 |
| 2,763,897 | Gates et al. | Sept. 25, 1956 |

FOREIGN PATENTS

| | | |
|---|---|---|
| 165,983 | Australia | Nov. 14, 1955 |